United States Patent
Mishra et al.

(10) Patent No.: US 12,149,440 B2
(45) Date of Patent: Nov. 19, 2024

(54) MULTICAST REDUNDANCY IN EVPN NETWORKS

(71) Applicant: Cisco Technology, Inc., San Jose, CA (US)

(72) Inventors: Mankamana Prasad Mishra, San Jose, CA (US); Ali Sajassi, Alamo, CA (US); Nitin Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/183,730

(22) Filed: Mar. 14, 2023

(65) Prior Publication Data

US 2024/0314066 A1   Sep. 19, 2024

(51) Int. Cl.
*H04L 45/00*   (2022.01)
*H04L 12/18*   (2006.01)
*H04L 45/42*   (2022.01)

(52) U.S. Cl.
CPC ............ *H04L 45/38* (2013.01); *H04L 12/185* (2013.01); *H04L 45/42* (2013.01)

(58) Field of Classification Search
CPC ........ H04L 45/38; H04L 12/185; H04L 45/42
See application file for complete search history.

(56) References Cited

U.S. PATENT DOCUMENTS

| | | | |
|---|---|---|---|
| 8,611,346 B1* | 12/2013 | Wijnands | H04L 12/185 370/312 |
| 9,608,833 B2* | 3/2017 | Yu | H04L 12/1886 |
| 9,843,513 B2* | 12/2017 | Nagarajan | H04L 45/026 |
| 9,898,317 B2* | 2/2018 | Nakil | H04L 41/0895 |
| 10,581,624 B2* | 3/2020 | Dutta | H04L 45/74 |
| 2014/0372616 A1* | 12/2014 | Arisoylu | H04L 67/1001 709/226 |
| 2020/0267011 A1* | 8/2020 | Peng | H04L 12/1854 |
| 2022/0272023 A1* | 8/2022 | Bidgoli | H04L 45/02 |
| 2023/0171194 A1* | 6/2023 | Talur | H04L 45/7453 370/392 |
| 2023/0261971 A1* | 8/2023 | Ahmed | H04L 49/70 D14/327 |

* cited by examiner

*Primary Examiner* — Abdullahi E Salad
(74) *Attorney, Agent, or Firm* — Polsinelli P.C.

(57) ABSTRACT

A system and associated methods provide a scalable solution for managing multiple multicast flows within a multicast group of a multicast network. The system groups redundant sources of the multicast group according to their associated multicast flows, assigns flow identifiers to each redundant source indicative of their associated multicast flows, and facilitates Single Forwarder election to select a Single Forwarder that belongs to the appropriate multicast flow. The system provides control plane extensions that enable signaling of which redundant source belongs to which multicast flow.

20 Claims, 10 Drawing Sheets

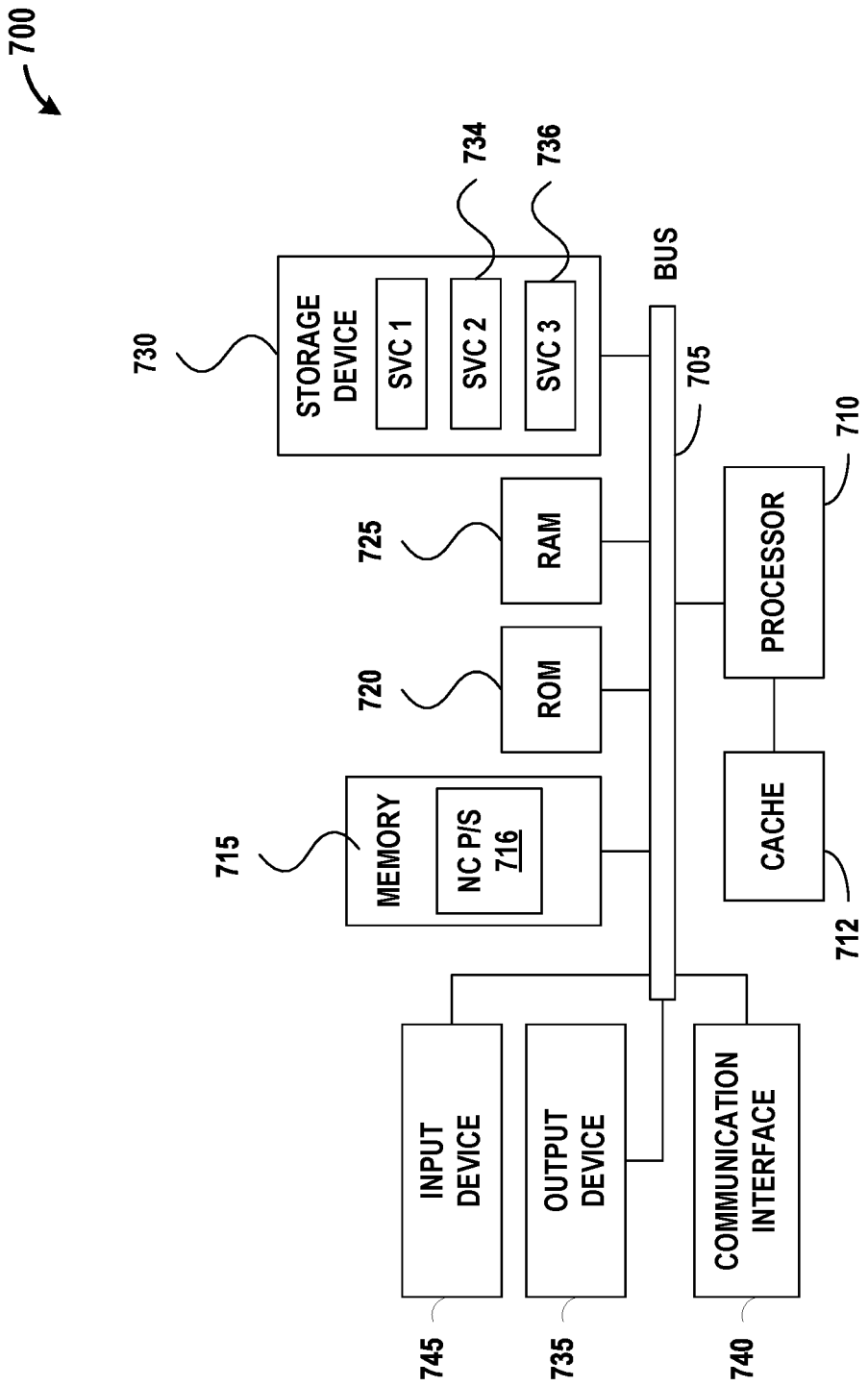

MULTICAST REDUNDANCY IN EVPN NETWORKS

BACKGROUND

Multicast networks ensure steady streams of content delivery by providing a multicast group including a plurality of redundant sources that communicate with a network. These redundant sources can be at completely different geographic locations. One benefit to multicast networks is that when a source delivering content fails, there is another redundant source available to take its place.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7 illustrates an example of a bus computing system according to some aspects of the present disclosure.

DESCRIPTION OF EXAMPLE EMBODIMENTS

Figure 1:
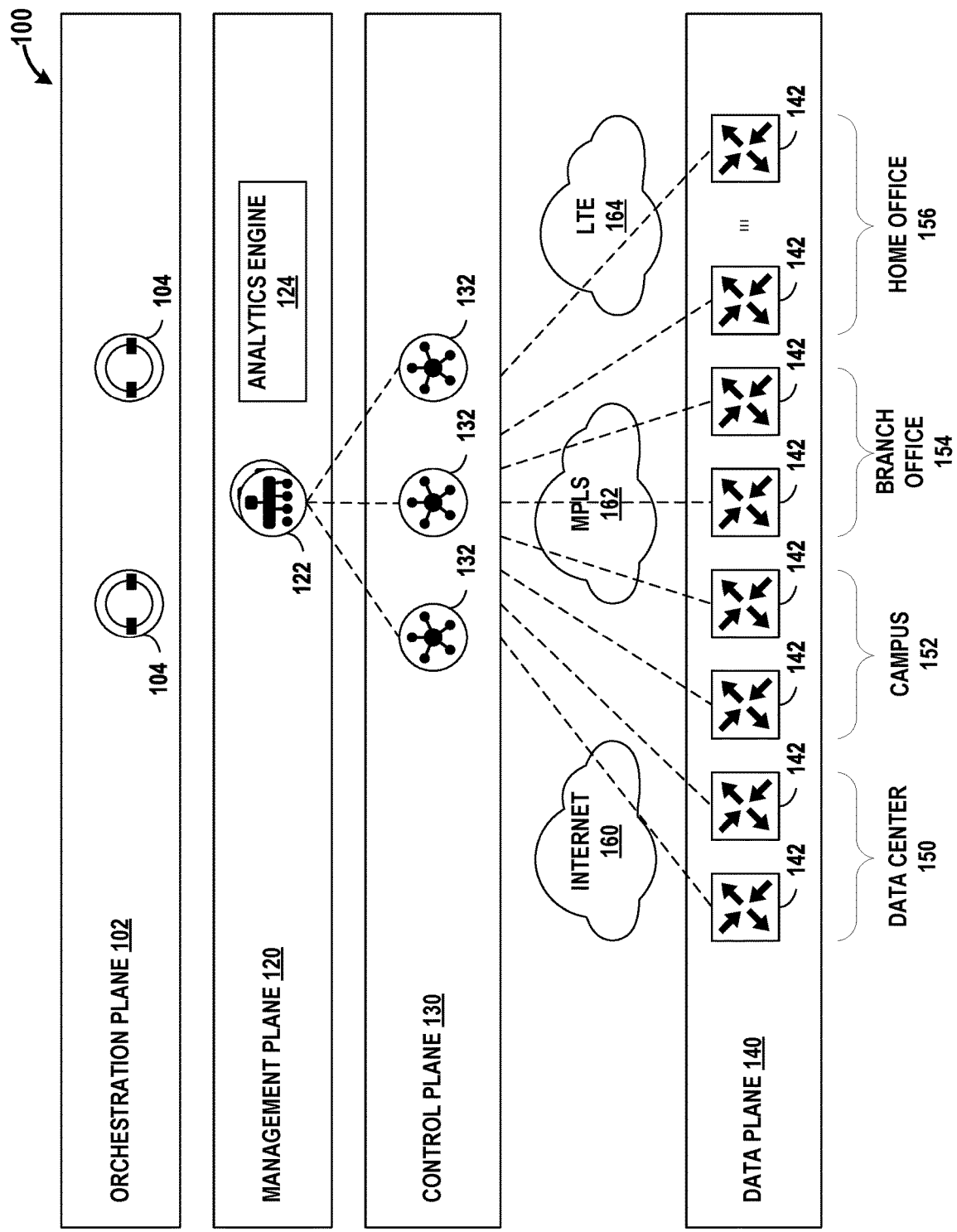
FIG. 1 illustrates an example of a high-level network architecture in accordance with aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Techniques described herein solve the foregoing problems by providing control plane extensions and procedures for managing multicast groups of a multicast network that considers multiple multicast flows, providing scalability and flexibility for managing multiple flows within the same multicast group. This approach results in reduction of errors that may arise in current implementations by allowing signaling within Selective P-Multicast Service Interface (S-PMSI) communications that indicate which multicast flow a redundant source belongs to, which enables election and re-election of Single Forwarders that belong to the appropriate multicast flow.

In one aspect, a method of managing multiple flows within the same multicast group includes: determining, at a provider edge device, a flow identifier for a first source of a multicast group, the flow identifier indicating a multicast flow associated with the first source, and the first source being one of a plurality of redundant sources that are commonly associated with the multicast flow and the flow identifier; and electing, at the provider edge device, a redundant source of the plurality of redundant sources as a Single Forwarder from a tuple indicative of the plurality of redundant sources having common flow identifiers. The provider edge device is one of a plurality of provider edge devices connected over a multicast network, each respective provider edge device being in communication with a respective redundant source of the plurality of redundant sources. The provider edge device determines the flow identifier based on a global policy across each provider edge device of the plurality of provider edge devices such that each redundant source commonly associated with the multicast flow exhibits a same value for the flow identifier, the flow identifier being unique to the multicast flow.

The method can further include: grouping the plurality of redundant sources associated with the multicast flow, the plurality of redundant sources being a subset of a plurality of sources connected to the plurality of provider edge devices over a multicast network; assigning the flow identifier to each redundant source of the plurality of redundant sources; and communicating the flow identifier to one or more provider edge devices of the plurality of provider edge devices connected over the multicast network. In one aspect, the flow identifier of the first source is communicated to the plurality of provider edge devices within a flow identifier field using a Selective P-Multicast Service Interface (S-PMSI).

Further, the method can include communicating the tuple indicative of the plurality of redundant sources having common flow identifiers to one or more provider edge devices of a plurality of provider edge devices connected over a multicast network. The tuple can similarly be communicated using S-PMSI.

The method can further include receiving, at the provider edge device in communication with the first source, a request for content of the multicast flow associated with the flow identifier. If the first source is the single forwarder, then the provider edge device can forward the request for content to the first source and the first source can respond to the request for content. However, if the first source is not the single forwarder, then the provider edge device can drop the request for content.

In a further aspect, the present disclosure provides a system including a provider edge device having a processor in communication with a memory, the memory including instructions executable by the processor to: determine a flow identifier for a first source of a multicast group in communication with the provider edge device, the flow identifier indicating a multicast flow associated with the first source, and the first source being one of a plurality of redundant sources that are commonly associated with the multicast flow and the flow identifier; and elect a redundant source of the plurality of redundant sources as a Single Forwarder from a tuple indicative of the plurality of redundant sources having common flow identifiers.

In yet a further aspect, the present disclosure provides one or more non-transitory computer-readable media comprising computer-readable instructions, which when executed by one or more processors of a provider edge device, cause the provider edge device to: determine a flow identifier for a first source of a multicast group in communication with the provider edge device, the flow identifier indicating a multicast flow associated with the first source, and the first source being one of a plurality of redundant sources that are commonly associated with the multicast flow and the flow identifier; and elect a redundant source of the plurality of redundant sources as a Single Forwarder from a tuple indicative of the plurality of redundant sources having common flow identifiers.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for a scalable solution to support redundant multicast sources. Current multicast EVPN technologies assume, for a multicast group having a plurality of sources, that each source that can send traffic will always have the same content (e.g., and are part of the same multicast flow). However, this is not always a valid assumption. For example, within a multicast group, a first subset of sources may be part of a different flow than a second subset of sources, and will thus deliver different content. Current protocol extensions do not provide flexibility to support these cases.

A computer network is a geographically distributed collection of nodes interconnected by communication links and segments for transporting data between end nodes, such as personal computers and workstations, or other network devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks can prove burdensome, smaller groups of computer networks may be maintained as routing domains or autonomous systems. An autonomous system is a network or group of networks under common administration and with common routing policies. A typical example of an autonomous system is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

To facilitate the routing of network traffic through one or more autonomous systems, the network elements of the autonomous systems need to exchange routing information to various network destinations. Border Gateway Protocol (BGP) is an Exterior Gateway Protocol (EGP) that is used to exchange routing information among network elements (e.g., routers) in the same or different autonomous systems. A computer host that executes a BGP process is typically referred to as a BGP host or a BGP network device. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

The networks within an autonomous system are typically coupled together by conventional "intradomain" routers configured to execute intradomain routing protocols, and are generally subject to a common authority. To improve routing scalability, a service provider (e.g., an ISP) may divide an autonomous system into multiple "areas" or "levels." It may be desirable, however, to increase the number of nodes capable of exchanging data; in this case, interdomain routers executing interdomain routing protocols are used to interconnect nodes of the various autonomous systems. Moreover, it may be desirable to interconnect various autonomous systems that operate under different administrative domains. As used herein, an autonomous system, area, or level is generally referred to as a "domain."

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for the central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, Multiprotocol Label Switching (MPLS) network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 142.

Figure 2:
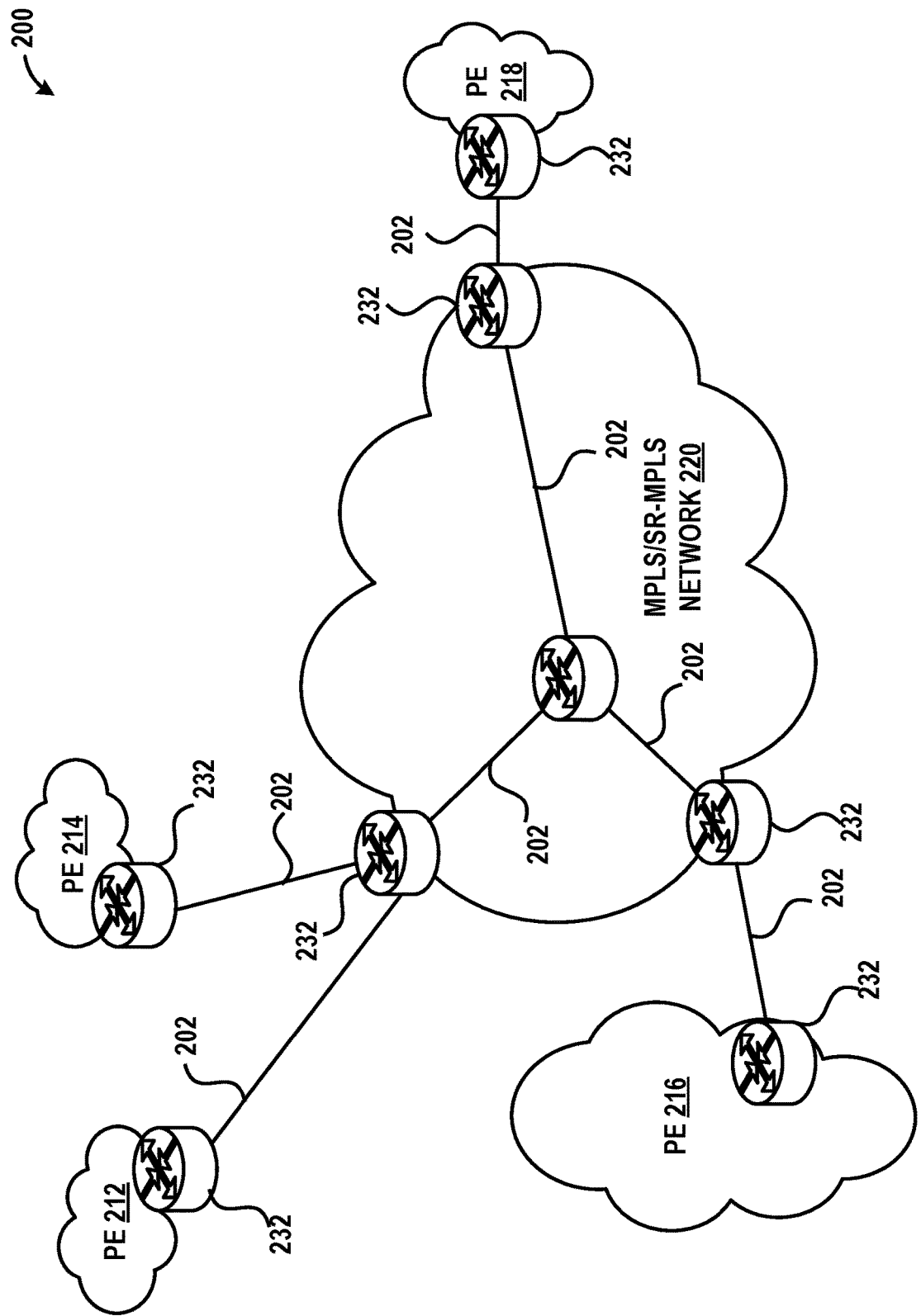
FIG. 2 illustrates an example communication network including one or more autonomous systems (ASes) in accordance with some aspects of the present technology.

FIG. 2 is a schematic block diagram of an example computer network 200 illustratively comprising network devices 214 interconnected by various methods of communication. For instance, the links 202 may be any suitable combination of wired links and shared media (e.g., wireless links, Internet Exchange Points, etc.) where certain network devices 214, such as, e.g., routers, computers, etc., may be in communication with other network devices 214, e.g., based on distance, signal strength, current operational status, location, etc. Those skilled in the art will understand that any number of network devices 214, links, etc. may be used in the computer network, and that the view shown herein is for simplicity.

Data packets (e.g., traffic and/or messages sent between the network devices 214) may be exchanged among the network devices 214 of the computer network 200 using predefined network communication protocols such as certain known wired protocols, as well as wireless protocols or other shared-media protocols where appropriate.

The computer network 200 includes a set of autonomous systems (AS); in the examples outlined herein, the set of ASes can include provider edge devices (PEs) 212, 214, 216 and 218 that can all be PIM domains, and can further include MPLS/SR-MPLS network 220 therebetween. The computer network 200 may be positioned in any suitable network environment or communications architecture that operates to manage or otherwise direct information using any appropriate routing protocol or data management standard. For example, computer network 200 may be provided in conjunction with a border gateway protocol (BGP).

As noted above, an autonomous system may be a collection of connected Internet Protocol (IP) routing network devices 232 under the control of one or more network operators that presents a common, clearly defined routing policy to a network (e.g., the Internet). Usually, an autonomous system comprises network devices 232 that are established on the edge of the system, and that serve as the system's ingress and egress points for network traffic. Moreover, the network devices 232 may be considered edge network devices, border routers, or core network devices within the respective autonomous system. These network devices typically, but not always, are routers or any other element of network infrastructure suitable for switching or forwarding data packets according to a routing protocol or switching protocol. For the purposes of the present disclosure, the network devices 232 located within an autonomous system may alternatively be referred to as "forwarding network devices" or "intermediate network devices." Moreover, for illustration purposes, the ASes (e.g., PEs 212, 214, 216, 218, and MPLS/SR-MPLS network 220) are shown with a limited number of network devices 232. In an actual implementation, however, an autonomous system normally includes numerous routers, switches, and other elements.

Each AS (e.g., PEs 212, 214, 216, 218, and MPLS/SR-MPLS network 220) may be associated with an Internet Service provider (ISP). Even though there may be multiple autonomous systems supported by a single ISP, the Internet only sees the routing policy of the ISP. That ISP has an officially registered Autonomous System Number (ASN). As such, a unique ASN is allocated to each autonomous system for use in BGP routing. ASNs are important primarily because they uniquely identify each network on the Internet.

To facilitate the routing of network traffic through the autonomous systems, or more specifically, the network devices 232 within the autonomous systems, the network devices may exchange routing information to various network destinations. As described above, BGP is conventionally used to exchange routing and reachability information among network devices 232 within a single autonomous system or between different autonomous systems. The BGP logic of a router is used by the data collectors to collect BGP autonomous system path information, e.g., the "AS_PATH" attribute, as described further below, from BGP tables of border routers of an autonomous system, to construct paths to prefixes.

To exchange BGP routing information, two BGP hosts (network devices 232), or peers, first establish a transport protocol connection with one another. Initially, the BGP peers exchange messages to open a BGP session, and, after the BGP session is open, the BGP peers exchange their entire routing information. Thereafter, in certain embodiments, only updates or changes to the routing information, e.g., the "BGP UPDATE" attribute, are exchanged, or advertised, between the BGP peers. The exchanged routing information is maintained by the BGP peers during the existence of the BGP session.

The BGP routing information may include the complete route to each network destination, e.g., "destination network device," that is reachable from a BGP host. A route, or path, comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/16". The "/16" indicates that the first 16 bits are used to identify the unique network leaving the remaining bits in the address to identify the specific hosts within this network.

A path joining a plurality of autonomous systems, e.g., links 202, may be referred to as an "AS_PATH." The AS_PATH attribute indicates the list of autonomous systems that must be traversed to reach the address destination. For example, as illustrated in FIG. 2, the PE 218 may store an AS_PATH attribute of "212 220 218" where the address destination is the PE 218 (or a particular IP address within PE 218). Here, the AS_PATH attribute indicates that the path to the address destination PE 218 from PE 212 passes through PE 214, and MPLS/SR-MPLS network 220 and to PE 218, in that order.

Although it may be preferable that all network devices 232 in the respective ASes (e.g., PEs 212, 214, 216, 218, and MPLS/SR-MPLS network 220) be configured according to BGP, in a real-world implementation, it may be unlikely that each network device communicates using BGP. Thus, the disclosed embodiments are applicable to scenarios where all network devices 232 in the computer network 200 are configured according to BGP, as well as scenarios where only a subset of the network devices 232 are configured as such.

Moreover, a security extension to the BGP has been developed, referred to as BGPSEC, which provides improved security for BGP routing. BGP does not include mechanisms that allow an autonomous system to verify the legitimacy and authenticity of BGP route advertisements. The Resource Public Key Infrastructure (RPKI) provides a first step towards addressing the validation of BGP routing data. BGPSEC extends the RPKI by adding an additional type of certificate, referred to as a BGPSEC router certificate, that binds an autonomous system number to a public signature verification key, the corresponding private key of which is held by one or more BGP speakers within this autonomous system. Private keys corresponding to public keys in such certificates can then be used within BGPSEC to enable BGP speakers to sign on behalf of their autonomous system. The certificates thus allow a relying party to verify that a BGPSEC signature was produced by a BGP speaker belonging to a given autonomous system. Thus, a goal of BGPSEC is to use signatures to protect the autonomous system Path attribute of BGP update messages so that a BGP speaker can assess the validity of the autonomous system Path in update messages that it receives. It should be understood, however, that the embodiments for implementing autonomous system Path security disclosed herein are not limited to BGPSEC; certain embodiments may, additionally or alternatively, be applicable to other suitable protocols, including, for example, SoBGP, S-BGP, and PGPBGP, to name just a few.

EVPN (Ethernet Virtual Private Network) is a technology for building virtual private networks (VPNs) using Ethernet Virtual Connections (EVCs) instead of traditional Layer 3 IP VPNs. It allows service providers to offer a wide range of Layer 2 and Layer 3 VPN services to customers over a common infrastructure, using Multiprotocol Label Switching (MPLS) or Virtual Extensible LAN (VXLAN) as the underlying transport technology. Corresponding with various systems and methods discussed herein, the MPLS/SR-MPLS networks (e.g., MPLS/SR-MPLS network 162 of FIG. 1, MPLS/SR-MPLS network 220 of FIG. 2) can operate under EVPN; likewise, the provider edge devices (e.g., PEs 212, 214, 216, 218 of FIG. 2) can communicate with associated sources over individual EVPN instances as discussed herein.

EVPN allows for the creation of a single Layer 2 or Layer 3 VPN domain that can span multiple sites, such as data centers or remote offices. This allows for the creation of a virtual LAN (VLAN) or virtual private wire service (VPWS) that can connect multiple sites together as if they were on the same physical LAN.

EVPN also supports several advanced features such as Virtual Private LAN Service (VPLS), which allows for the creation of a full mesh of Layer 2 VPN connections between multiple sites, and Any-to-Any communication within the VPN. Additionally, EVPN also supports BGP-based auto-discovery and signaling, which simplifies the configuration and management of VPNs.

EVPN is a powerful technology that offers many benefits over traditional IP VPNs. It allows for more efficient use of network resources, better scalability, and more advanced features such as VPLS and Any-to-Any communication. It is an ideal solution for service providers looking to offer advanced VPN services to their customers, as well as for enterprise customers looking to connect multiple sites together over a virtual private network.

For clarity of explanation, in some instances the present technology may be presented as including individual functional blocks including functional blocks comprising devices, device components, steps or routines in a method embodied in software, or combinations of hardware and software.

Managing Multiple Multicast Flows in Multicast Networks Over EVPN

FIGS. 3A-3D show a multicast network 300, including a plurality of EVPN instances 310 in communication with one another over an MPLS (or SR-MPLS) network 320 for communication of data from sources associated with each EVPN instance 310. As shown, each EVPN instance 310 can be connected to the MPLS network 320 by a respective provider edge device (hereinafter, "PEs" 330). In the simplified example shown, the MPLS network 320 communicates with four PEs (e.g., a first PE 330A, a second PE 330B, a third PE 330C and a fourth PE 330D), which are respectively associated with four EVPN instances (e.g., a first EVPN instance 310A, a second EVPN instance 310B, a third EVPN instance 310C, and a fourth EVPN instance 310D). The first EVPN instance 310A can have a first BGP address such as 1.1.1.1; the second EVPN instance 310B can have a second BGP address such as 2.2.2.2; the third EVPN instance 310C can have a third BGP address such as 3.3.3.3; and the fourth EVPN instance 310D can have a fourth BGP address such as 4.4.4.4. In some embodiments, the MPLS network 320 can include a controller 322 that communicates with the PEs 330; the controller 322 can apply various functionalities discussed herein, such as but not limited to grouping sources according to their associated multicast flows, assigning flow IDs, and initiating, facilitating, or otherwise managing communications between various components of the multicast network 300.

Figure 3A:
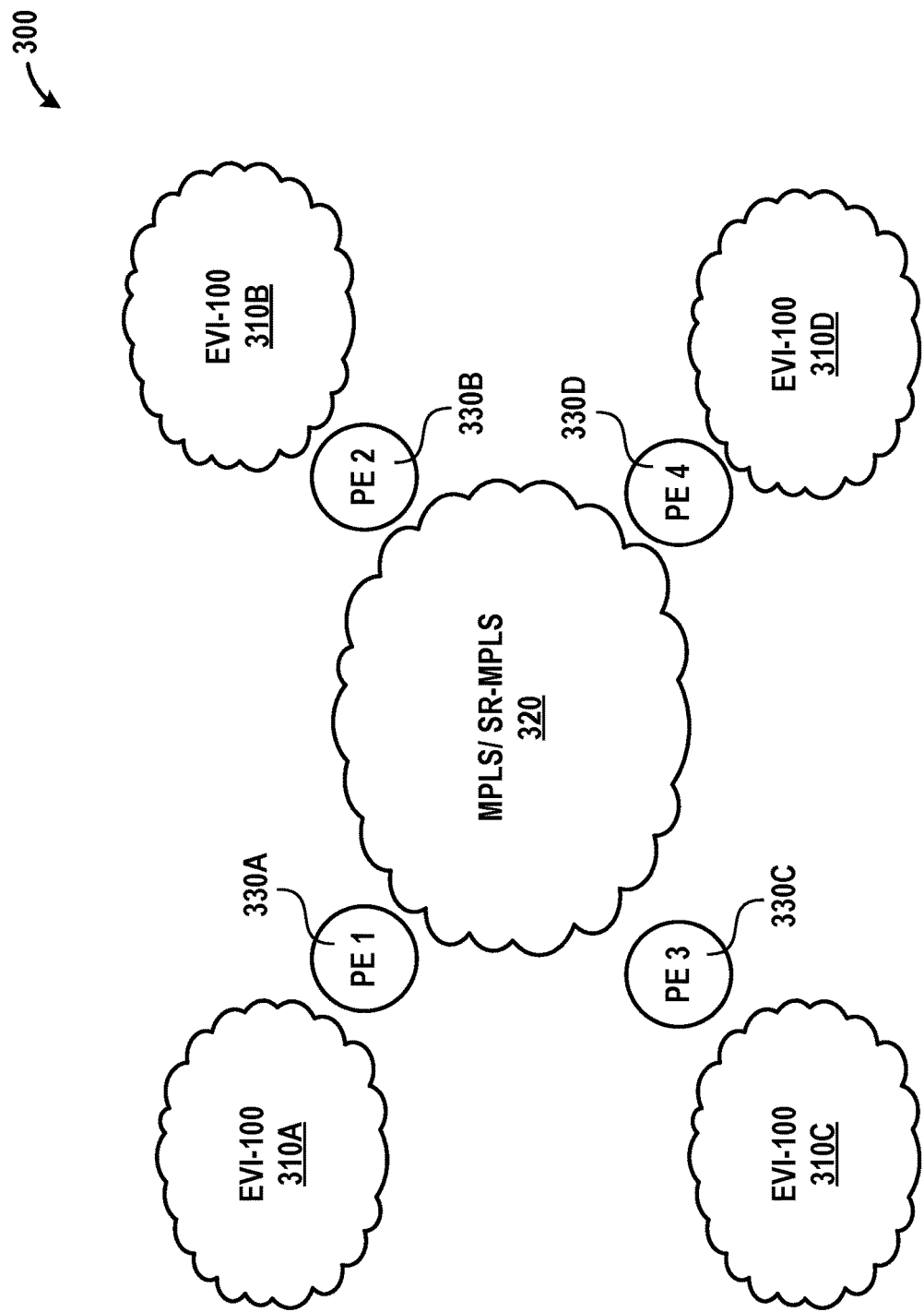
FIG. 3A illustrates a multicast network including a plurality of provider edge devices that communicate over EVPN through an MPLS/SR-MPLS network in accordance with some aspects of the present technology.
Figure 3B:
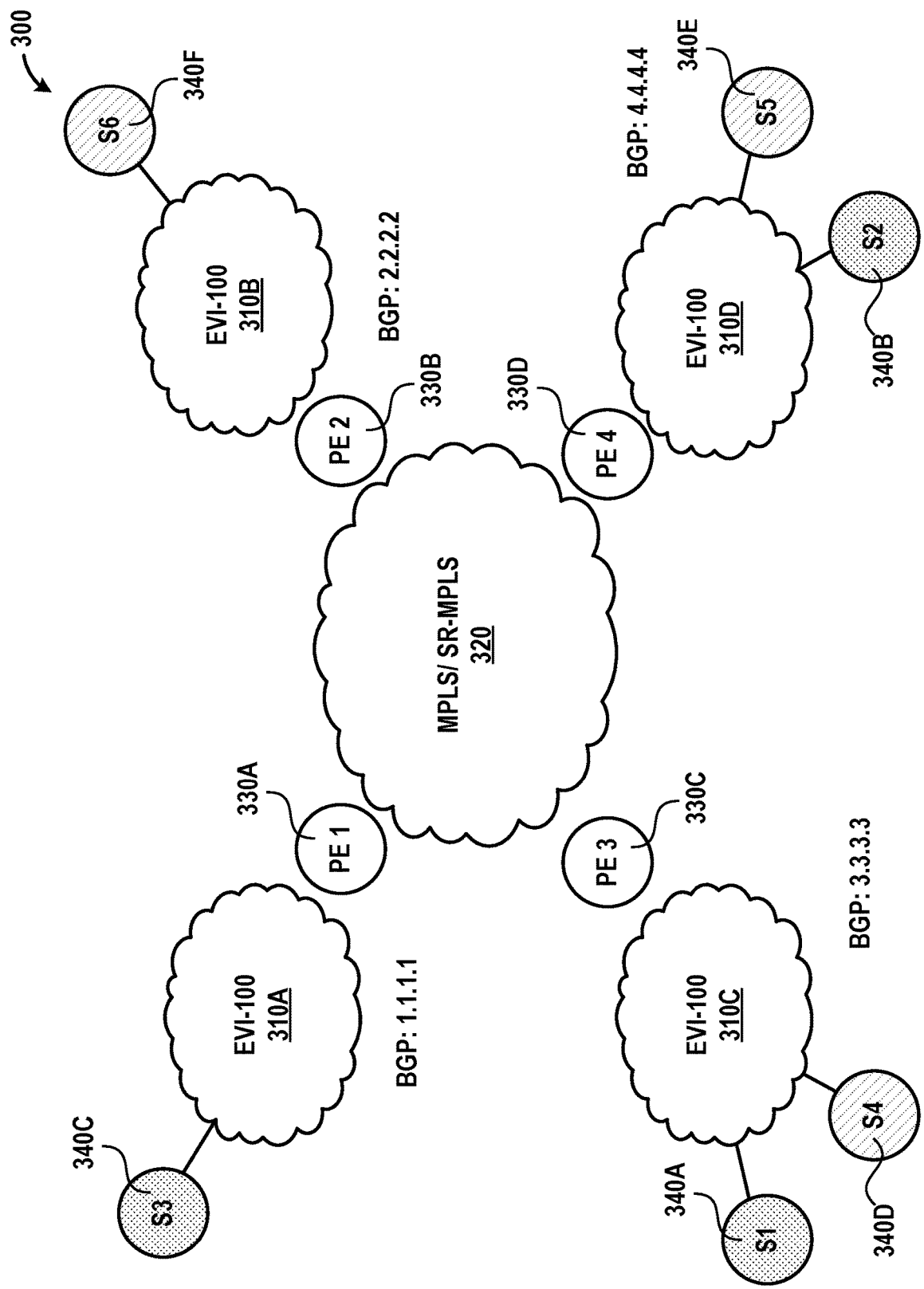
FIG. 3B illustrates the multicast network of FIG. 3A including a plurality of sources that communicate with the provider edge devices, where the plurality of sources belong to different multicast flows in accordance with some aspects of the present technology.

Further, as shown in FIG. 3B, each respective PE 330 can receive content from one or more sources 340 of a plurality of sources 340 of a multicast group of the multicast network 300 for transmission to a destination over the MPLS network 320. In the example, the third PE 330C communicates with a first source 340A (S1, G) and a fourth source 340D (S4, G) over the third EVPN instance 310C, the fourth PE 330D communicates with a second source 340B (S2, G) and a fifth source 340E (S5, G) over the fourth EVPN instance 310D, the first PE 330A communicates with a third source 340C (S3, G) over the first EVPN instance 310A, and the second PE 330B communicates with a sixth source 340F (S6, G) over the second EVPN instance 310B.

Grouping by Multicast Flow

The plurality of sources 340, while belonging to the same multicast group, may not always belong to the same multicast "flow" (e.g., may not all deliver the same content). In the example of FIG. 3B, the first source 340A, the second source 340B and the third source 340C may belong to one multicast flow while the fourth source 340D, the fifth source 340E and the sixth source 340F may belong to another multicast flow.

A first step includes grouping the plurality of sources 340 based on multicast flow. This "grouping" step can be implemented by user-configured or controller-driven policy at a controller or another component, such as the controller 322 or the associated PEs 330 connected to the plurality of sources 340. Sources 340 are grouped based on the multicast content they are providing-if two or more sources 340 provide the exact same multicast content, then they are grouped together even if they are present at different geographical locations and have different source addresses. For multicast groups where there is more than one multicast flow, then the sources 340 are grouped according to their multicast flow. Corresponding with the example of FIG. 3B, a resultant grouping of sources split between two multicast flows can be as follows:

({S1, S2, S3}, G)—Flow 1
({S4, S5, S6}, G)—Flow 6

A second step includes allocating each "flow" with a unique flow ID to enable identification of which sources belong to the same flow. Flow ID allocation can be manually configured, or can be globally allocated. For example, a controller device such as controller 322 in communication with components of the MPLS network 320 can generate the flow ID. In other examples, a user can manually configure the flow IDs or define a range of acceptable flow IDs that can be allocated. The flow ID must be able to uniquely identify the flow across the domain. Corresponding with the example of FIG. 3B, a first flow ID "X" can be allocated for "flow 1" and a second flow ID "Y" can be allocated for "flow 6" as follows:

({S1, S2, S3}, G)—Flow 1—Allocated flow_ID "X"
({S4, S5, S6}, G)—Flow 6—Allocated flow_ID "Y"

Overlay Signaling Extension

A third step includes communicating the flow ID across the MPLS network 320 over Provider Multicast Service Interface (PMSI) and/or Selective Provider Multicast Service Interface (S-PMSI). PMSI and/or S-PMSI can be configured to carry the flow ID within another field. Corresponding with the example of FIG. 3B, each site (e.g., where each "site" in this context means an extension of the MPLS network 320 at different physical locations; for example, one site having one source may be in California, another site having another source for the same flow ID can be in another geographic location such as New York, India, Europe, etc.) receives the flow ID within PMSI and/or S-PMSI signaling as:

(S1, G), Flow_ID X, Originator 4.4.4.4
(S2, G), Flow_ID X, Originator 3.3.3.3
(S3, G), Flow_ID X, Originator 1.1.1.1
(S4, G), Flow_ID Y, Originator 4.4.4.4
(S5, G), Flow_ID Y, Originator 3.3.3.3
(S6, G), Flow_ID Y, Originator 2.2.2.2

Single Forwarder Election and Data Plane Procedures

An important functionality of EVPN and multicast systems is single forwarder election, in which each all "peers" within a multicast group elect one source to be a single forwarder for sending content over the network. When one source fails, a new source can be elected; as such, having redundant sources allows robust content delivery over the network by ensuring that a new source is available to take the place of the failing source. When there are multiple flows being managed by a multicast group, it is imperative that the single forwarder belongs to the appropriate flow and can send the appropriate content. As such, a fourth step includes generating and communicating a tuple by a controller (e.g., controller 322) or other device in association with the MPLS network 320 to one or more components of the MPLS network 320 that communicates flow, flow ID and a list of peers (e.g., redundant sources) associated with the flow.

{flow, Flow_ID, peers}

Any existing method can be applied to elect a redundant source (e.g., first source 340A, second source 340B, third source 340C) of the plurality of redundant sources as a Single Forwarder from the tuple indicative of the plurality of redundant sources having common flow identifiers. In some examples, redundant sources are user-provisioned, as a user can configure the MPLS network 320 to assign multiple sources 340 at different locations to the same multicast flow.

Figure 3C:
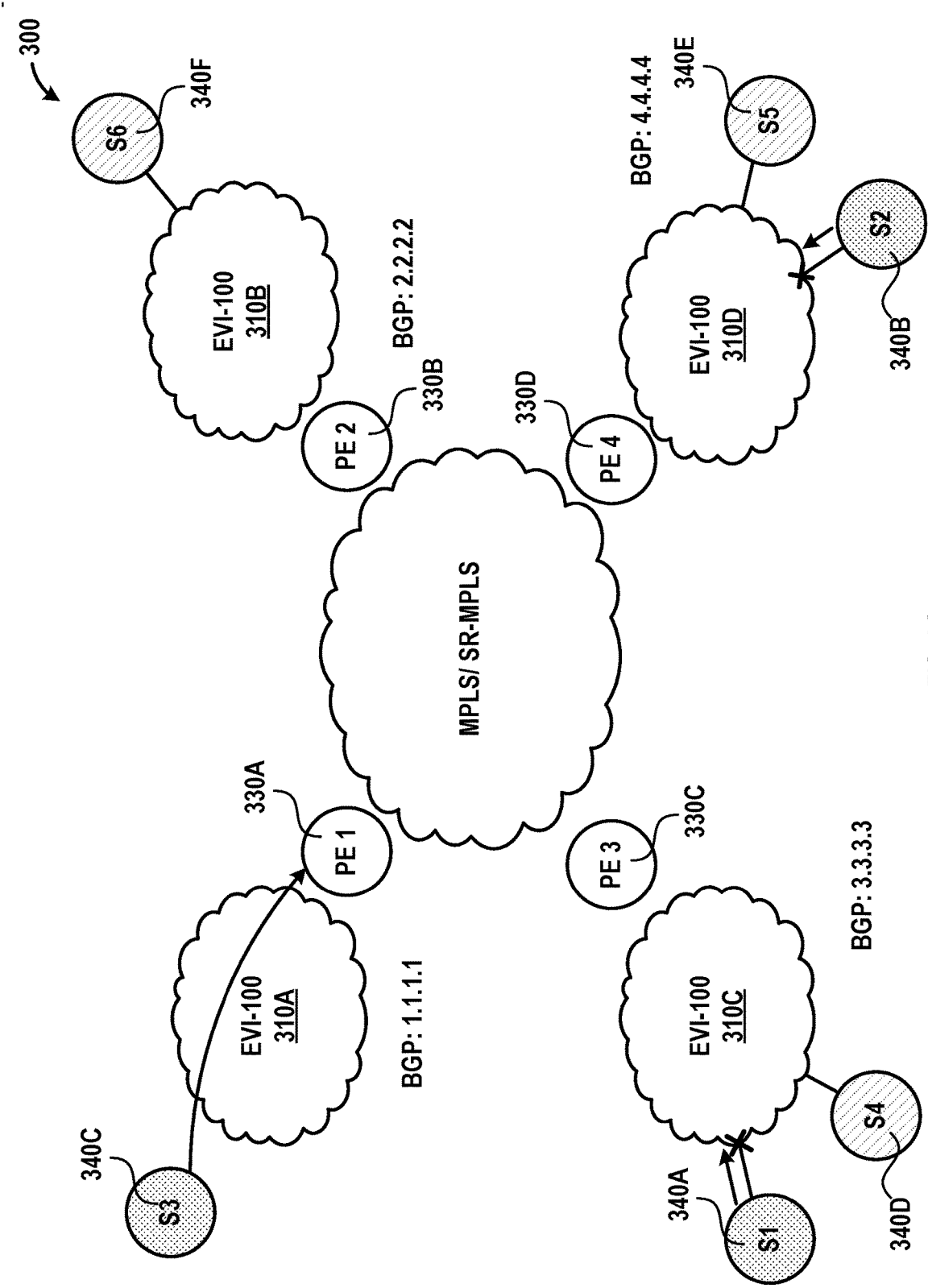
FIG. 3C illustrates the multicast network of FIG. 3B with one source operating as a Single Forwarder in accordance with some aspects of the present technology.

In an example shown in FIG. 3C, the first PE 330A associated with the third source 340C ((S3, G), Flow_ID X, Originator 1.1.1.1) is selected as the Single Forwarder for Flow 1. As such, the first PE 330A allows transmission of content from the third source 340C, across the first EVPN instance 310A, through the first PE 330A, and across the MPLS network 320, where the content can then be forwarded to a destination node.

| Flow ID 1 |
| --- |
| (S1, G) 3.3.3.3 |
| (S2, G) 4.4.4.4 |
| (S3, G) 1.1.1.1 |
| Forwarder: 1.1.1.1 |

Following election of one peer as the single forwarder, the remaining peers will stop dropping traffic as reverse path forwarding (RPF) failure. Corresponding with the example of FIG. 3C, only the first PE 330A having address 1.1.1.1 will accept traffic from the associated third source 340C for forwarding across the MPLS network 320. The first source 340A and the second source 340B are still present within the multicast group and are still assigned to Flow 1, but their respective second and fourth PEs 330B and 330D may not forward content from the first source 340A and the second source 340B as indicated. These redundant sources will be "backup" forwarders in case the elected single forwarder stops transmitting content.

In case of source failure, the tuple signaled over S-PMSI would be withdrawn and a new single forwarder election will take place between remaining peers; RPF will also be updated.

| Flow ID 1 |
| --- |
| (S1, G) 3.3.3.3 |
| (S2, G) 4.4.4.4 |
| — |
| Forwarder: 3.3.3.3 |

Figure 3D:
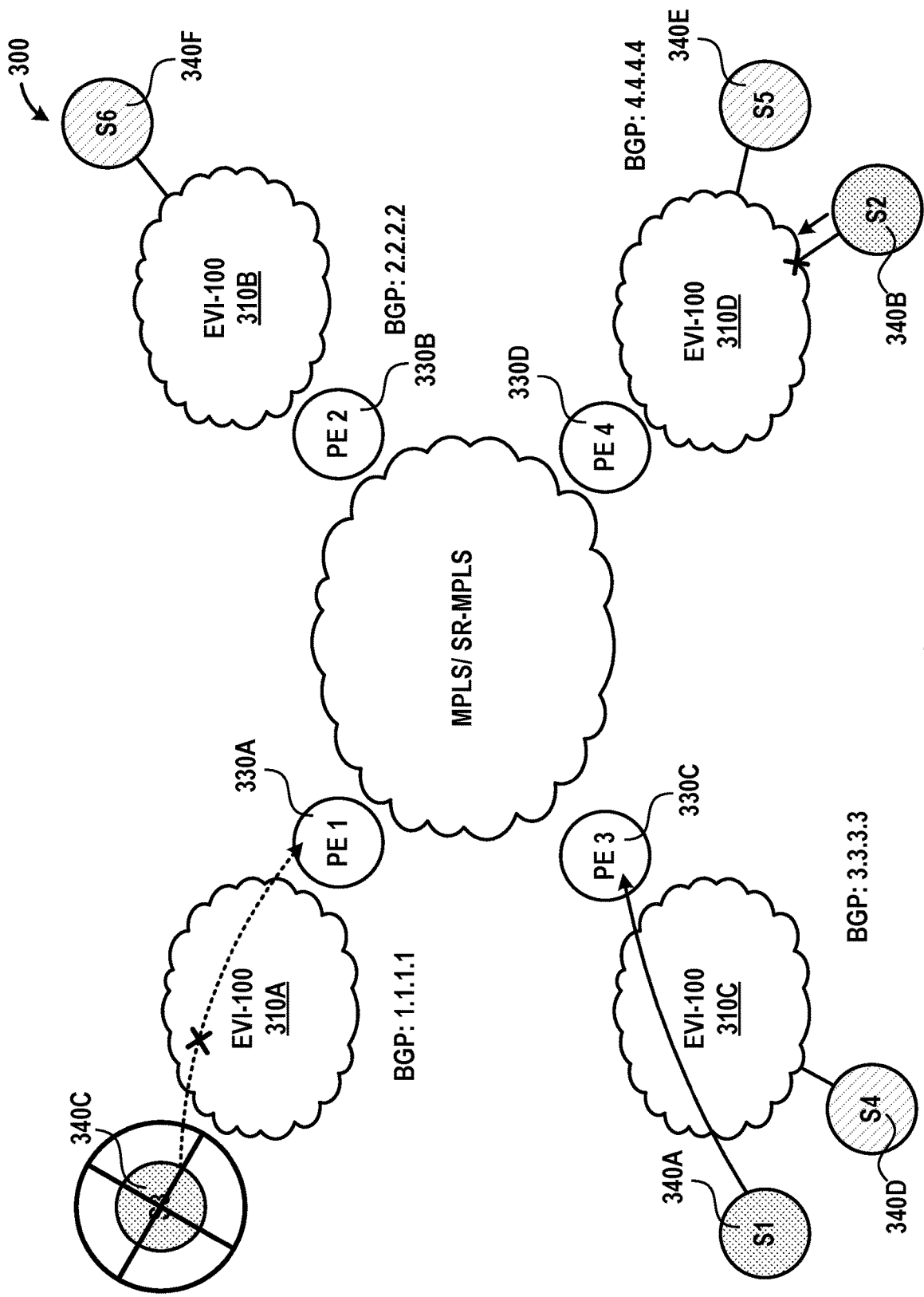
FIG. 3D illustrates the multicast network of FIG. 3C following failure of an original Single Forwarder and selection of a new source to operate as the Single Forwarder in accordance with some aspects of the present technology.

Corresponding with the example of FIG. 3D, the first PE 330A associated with the third source 340C ((S3, G), Flow_ID X, Originator 1.1.1.1) is no longer available. A new tuple can be generated that communicates flow, flow ID and a list of peers associated with the flow (e.g., redundant sources, but this time without the first PE 330A and associated third source 340C); in the example, the third PE 330C associated with the first source 340A ((S2, G), Flow_ID X, Originator 3.3.3.3) is selected as the Single Forwarder for Flow 1. As such, the third PE 330C can then allow transmission of content from the first source 340A, across the third EVPN instance 310C, through the third PE 330C, and to the MPLS network 320, where the content can then be forwarded to a destination node.

In the case of "hot standby", the above procedure can remain the same, except a "last hop" router will determine which redundant source should be elected as a new Single Forwarder should a previously-elected redundant source fail. This corresponds with cases where multicast content for a multicast flow is sent all the way throughout the MPLS network 320 until reaching the last hop router (e.g., a router that is close to a receiver), and out of "n" copies of the same multicast content only one would be accepted. The associated egress router (e.g., of the PE belonging to the failed source) will consider the flow IDs associated with each "candidate" which redundant source to ensure that the new Single Forwarder belongs to the appropriate multicast flow. As discussed, the flow ID is used to determine which multicast flows are carrying the same multicast content.

In the case of "warm standby", the above procedure is similarly applicable, but each PE can optionally send "join requests" (e.g., to join the multicast group) with the appropriate flow ID to ensure that source trees (e.g., that characterize connectivity between components of a multicast network) are built in advance. This enables receipt of traffic from associated redundant sources as soon as the Single Forwarder election is complete.

With regards to handling redundant source cases for different mechanisms to build source trees for EVPN and transport multicast traffic (e.g., such as PIM, Multicast Label Distribution Protocol (MLDP) and Tree Segment Identifier (Tree-SID)), the functionalities discussed herein can be implemented independent of the transport protocol or tree building protocols. mVPN procedures can also enhance BGP signaling to carry the flow ID associated with the given multicast flow.

Figure 4:
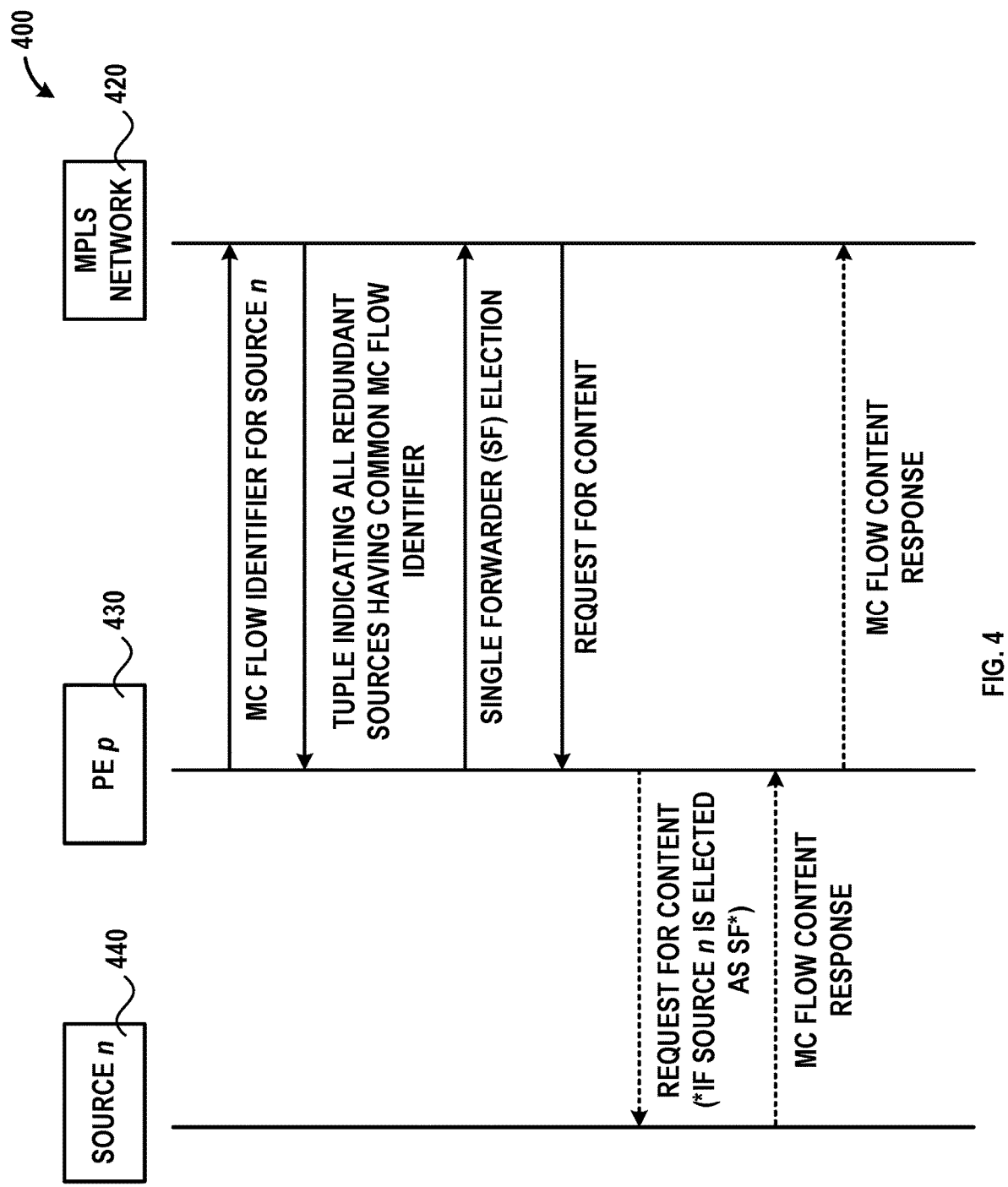
FIG. 4 illustrates a sequence diagram for managing multicast flows in accordance with some aspects of the present technology.

FIG. 4 shows a sequence diagram for managing multicast content transmission according to the systems and methods outlined herein. First, a PE p 430 (e.g., a provider edge device, corresponding to PEs 212, 214, 216 and 218 in FIG. 2 and PEs 330 in FIGS. 3A-3D) in communication with a source n 440 (e.g., a source corresponding to sources 340 in FIGS. 3B-3D) communicates a flow identifier for the source n 440 to an MPLS network 420 (e.g., or an SR-MPLS network, corresponding to MPLS network 162 in FIG. 1. MPLS/SR-MPLS network 220 in FIG. 2, and MPLS network 320 in FIGS. 3A-3D); the flow identifier indicates a multicast flow associated with source n 440, where source n 440 is one of a plurality of redundant sources that are commonly associated with the same multicast flow. In other words, the flow identifier indicates the content "flow" that the associated source n 440 belongs to. This step can be performed by each individual PE of the plurality of PEs, where each PE is in communication with one or more redundant sources of the multicast group. The flow identifier of the source n 440 can be communicated within a flow identifier field using a Selective P-Multicast Service Interface (S-PMSI). The PE p 430 can determine the flow identifier based on a global policy across each PE of the plurality of PEs such that each redundant source commonly associated with the multicast flow exhibits the same value for the flow identifier. The flow identifier must also be unique to the multicast flow.

When all multicast flow identifiers are received at the MPLS network 420, the MPLS network 420 aggregates multicast flow identifiers for each respective source into a tuple indicating all redundant sources having common multicast flow identifiers. The MPLS network 420 then communicates the tuple indicating all redundant sources having a common MC flow identifier that belong to the multicast group back to each respective PE; in the example shown, the MPLS network 420 communicates the tuple indicating all redundant sources having a common MC flow identifier to the PE p 430. In some examples, the tuple can be communicated back to the PE p 430 using S-PMSI. Further, in some embodiments, some functionalities performed by the MPLS network 420 discussed herein can be performed with the aid of a controller device or node in association with the MPLS network 420.

Next, each respective PE participates in a Single Forwarder (SF) election to elect one redundant source from the tuple associated with the multicast flow as a single forwarder; the remaining redundant sources that are not selected as a single forwarder can remain on "standby" to become the single forwarder if the elected single forwarder stops transmitting data. The single forwarder election can be policy driven. As shown, the PE p 430 (and all other PEs whose associated sources are indicated within the tuple) communicates its single forwarder election to the MPLS network 420.

Following election of the single forwarder from the grouping of redundant sources associated with the same multicast flow, each respective PE including PE p 430 can receive a request for content from the MPLS network 420. However, only the PE whose associated source is selected as the Single Forwarder will forward the request for content onward to its associated source.

In the example shown, when source n 440 is the single forwarder, the PE p 430 forwards the request for content onward to the source n 440. Upon receiving the request for content, source n 440 sends a multicast flow content response to PE p 430, which in turn forwards the multicast flow content response to the MPLS network 420 for transmission to a destination node.

If source n 440 is not the single forwarder, then the PE p 430 will drop the request for content upon receipt. As such, source n 440 will not receive the request for content from the PE p 430, and will not send a multicast flow content response to the PE p 430. However, PE p 430 and source n 440 will remain on "standby" in case a new single forwarder election is needed.

If source n 440 is not the single forwarder, but the single forwarder stops transmitting data, then a new single forwarder election will take place. Similar to the single forwarder election step discussed above, the PE p 430 (and all other PEs whose associated sources are indicated within the tuple, however this time the PE belonging to the original single forwarder may be omitted) communicates its new single forwarder election to the MPLS network 420. If source n 440 is selected as the new single forwarder, then PE p 430 can receive a request for content from the MPLS network 420 and forward the request for content onward to the source n 440. In response, source n 440 sends a multicast flow content response to PE p 430, which in turn forwards the multicast flow content response to the MPLS network 420 for transmission to a destination node. In some embodiments, the multicast flow content response sent by source n 440 can "pick up" within the same multicast flow where the original single forwarder left off.

In this manner, the present systems and methods outlined herein enable single forwarder election from a source of a plurality of redundant sources that are commonly associated with a multicast flow and associated flow identifier. Previous implementations that do not account for the possibility of having different multicast flows within the same multicast group may have problems when a single forwarder is selected that does not belong to the same multicast flow. As such, the systems and methods outlined herein ensure proper management of redundant sources within a multicast group by actively considering which multicast flow each respective redundant source belongs to.

Figure 5:
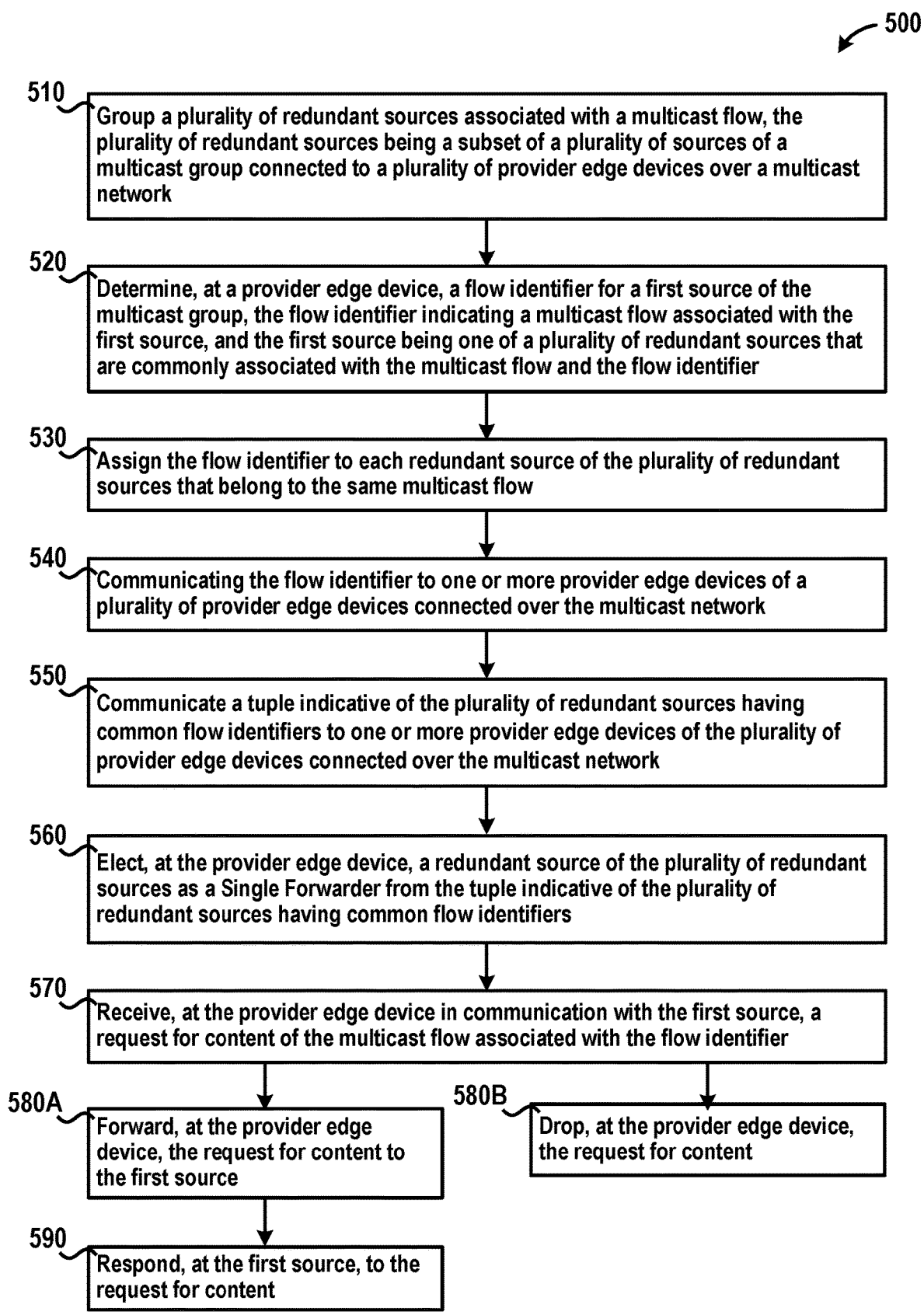
FIG. 5 illustrates a method for managing multicast flows in accordance with some aspects of the present technology.

FIG. 5 shows a method 500 for managing content delivery for multicast flows within a multicast group according to various systems and methods discussed herein with reference to FIGS. 3A-4.

At step 510, a controller device or another component (e.g., such as individual PEs 330 or controller device 322 of FIGS. 3A-3D) associated with an MPLS network (e.g., MPLS/SR-MPLS network 162, 220, 320, 420 of FIGS. 1-4) groups a plurality of redundant sources (e.g., sources 340A-340C, 440 of FIGS. 3A-4) associated with a common multicast flow, the plurality of redundant sources being a subset of a plurality of sources of a multicast group connected to a plurality of provider edge devices (e.g., PEs 212, 214, 216, 218, 330, 430 of FIGS. 2-4) over a multicast network.

At step 520, a provider edge device (e.g., one of PEs 212, 214, 216, 218 in FIG. 2; one of PEs 330A, 330C, 330D in FIGS. 3A-3D; PE 430 of FIG. 4) or another device of the MPLS network (such as controller device 322 of FIGS. 3A-3D) determines a flow identifier for a first source (e.g., source 340A in FIGS. 3A-3D, source 440 in FIG. 4) of the multicast group, the flow identifier indicating a multicast flow associated with the first source, and the first source being one of a plurality of redundant sources that are commonly associated with the multicast flow and the flow identifier. The provider edge device is one of a plurality of provider edge devices connected over the multicast network, each respective provider edge device being in communication with a respective redundant source of the plurality of redundant sources. In some examples, the provider edge device determines the flow identifier based on a global policy across each provider edge device of the plurality of provider edge devices such that each redundant source commonly associated with the multicast flow exhibits a same value for the flow identifier, the flow identifier being unique to the multicast flow.

At step 530, the provider edge device and/or a controller device of the MPLS network assigns the flow identifier to each redundant source of the plurality of redundant sources that belong to the same multicast flow.

At step 540, the provider edge device and/or a controller device of the MPLS network communicates the flow identifier to one or more provider edge devices of the plurality of provider edge devices connected over the multicast network. In some examples, the flow identifier can be communicated within a flow identifier field using a Selective P-Multicast Service Interface (S-PMSI).

At step 550, the provider edge device and/or a controller device of the MPLS network communicates a tuple indicative of the plurality of redundant sources having common flow identifiers to the one or more provider edge devices of the plurality of provider edge devices connected over the multicast network. Similarly, in some examples the tuple can be communicated using a Selective P-Multicast Service Interface (S-PMSI).

At step 560, the plurality of provider edge devices elect a redundant source of the plurality of redundant sources as a Single Forwarder from the tuple indicative of the plurality of redundant sources having common flow identifiers.

At step 570, a provider edge device of the plurality of provider edge devices receives a request for content of the multicast flow associated with the flow identifier.

If the first source associated with the provider edge device of step 570 had been elected as the Single Forwarder at step 560, then at step 580A, the provider edge device forwards the request for content to the first source. At step 590, the first source responds to the request for content with a multicast flow content response that includes the requested content associated with the multicast flow. The provider edge device receives the multicast flow content response from the first source and transmits the multicast flow content response to the MPLS/SR-MPLS network for eventual forwarding to a destination node.

If the first source associated with the provider edge device of step 570 had not been elected as the Single Forwarder at step 560, then at step 580B, the provider edge device drops the request for content.

If the redundant source elected as the Single Forwarder at step 560 stops transmitting content, then the plurality of provider edge devices repeat step 560 by electing a redundant source of the plurality of redundant sources as a Single Forwarder from a tuple indicative of the plurality of redundant sources having common flow identifiers; in some examples, the tuple can omit the failed redundant source.

Figure 6:
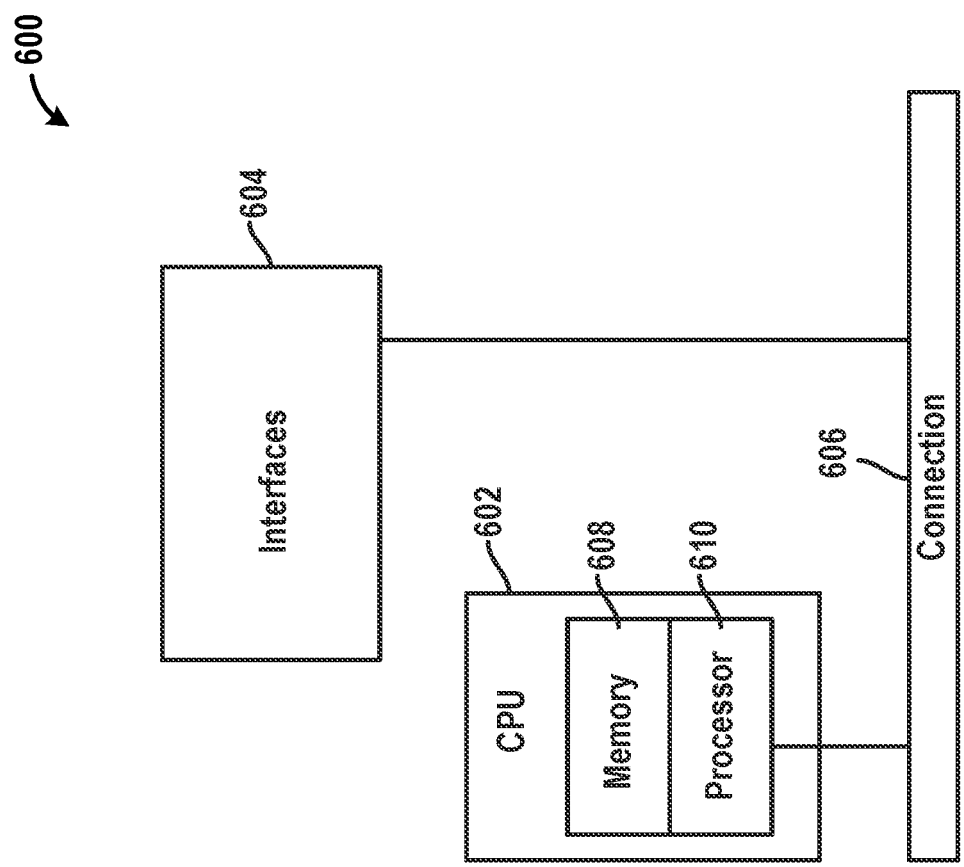
FIG. 6 illustrates an example of a network device according to some aspects of the present disclosure.

FIG. 6 illustrates an example of a network device, according to some aspects of the present disclosure. Network device 600 can be a network appliance implementing the functionalities of BGP and/or the provider edge devices (e.g., PEs 212, 214, 216, 218 shown in FIG. 2, PEs 330 shown in FIGS. 3A-3D, PE 430 shown in FIG. 4), among other components described above with reference to FIGS. 1-4, such as a controller or other device that implements functionalities of the MPLS network or SR-MPLS network (e.g., MPLS network 162 shown in FIG. 1, MPLS/SR-MPLS network 220 shown in FIG. 2, MPLS/SR-MPLS network 320 shown in FIGS. 3A-3D, and/or MPLS/SR-MPLS network 420 shown in FIG. 4). The network device 600 can include a master central processing unit (CPU) 602, interfaces 604, and a bus 606 (e.g., a PCI bus). When acting under the control of appropriate software or firmware, the CPU 602 can be responsible for executing packet management, error detection, and/or routing functions. The CPU 602 preferably accomplishes all these functions under the control of software including an operating system and any appropriate applications software. The CPU 602 may include one or more processors 608 such as a processor from the Motorola family of microprocessors or the MIPS family of microprocessors. In an alternative embodiment, the processor 608 can be specially designed hardware for controlling the operations of the network device 600. In an embodiment, a memory 610 (such as non-volatile RAM and/or ROM) can also form part of the CPU 602. However, there are many different ways in which memory could be coupled to the system.

The interfaces 604 can be provided as interface cards (sometimes referred to as line cards). The interfaces 604 can control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 604 may include ports appropriate for communication with the appropriate media. In some cases, the interfaces 604 may also include an independent processor and, in some instances, volatile RAM. The independent processors may control communication intensive tasks such as packet switching, media control, and management. By providing separate processors for the communication intensive tasks, the interfaces 604 may allow the CPU 602 to efficiently perform routing computations, network diagnostics, security functions, and so forth.

Although the system shown in FIG. 6 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 600.

Regardless of the network device's configuration, it may employ one or more memories or memory modules (including the memory 610) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

FIG. 7 illustrates an example of a bus computing system, according to some aspects of the present disclosure. Computing system 700 can be utilized as part of any one of the network components described above with reference to FIGS. 1-4 and 6. Further, aspects of computing system 700 can be employed to apply aspects of method 500 shown in FIG. 5, which corresponds to various steps and functionalities outlined above with respect to FIGS. 3A-4. Components of the computing system 700 are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module (services), such as services SVC 1 732, SVC 2 734, and SVC 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software SVCs 732, 734, and 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function. In a further aspect, the memory 715 and/or the storage device 730 can also include network connection processes/services (abbreviated as NC P/S) 716 that includes instructions, which, when executed by the processor 710, cause the processor 710 to implement various functionalities discussed above and shown in FIGS. 3A-5, including aspects of method 500.

For clarity of explanation, in some instances the various embodiments may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method, comprising:
   determining, at a provider edge device, a flow identifier for a first source of a multicast group, the flow identifier indicating a multicast flow associated with the first source, and the first source being associated with a first virtual private network and one of a plurality of redundant sources that are commonly associated with the multicast flow and the flow identifier, wherein the plurality of redundant sources are each connected to a Multiprotocol Label Switching network; and
   electing, at the provider edge device, a redundant source of the plurality of redundant sources and associated with a second virtual private network as a Single Forwarder from a tuple indicative of the plurality of redundant sources having common flow identifiers.

2. The method of claim 1, the provider edge device being one of a plurality of provider edge devices connected over a multicast network, each respective provider edge device being in communication with a respective redundant source of the plurality of redundant sources.

3. The method of claim 2, wherein the provider edge device determines the flow identifier based on a global policy across each provider edge device of the plurality of provider edge devices such that each redundant source commonly associated with the multicast flow exhibits a same value for the flow identifier, the flow identifier being unique to the multicast flow.

4. The method of claim 1, further comprising:
   grouping the plurality of redundant sources associated with the multicast flow, the plurality of redundant sources being a subset of a plurality of sources connected to a plurality of provider edge devices over a multicast network; and assigning the flow identifier to each redundant source of the plurality of redundant sources.

5. The method of claim 1, further comprising:
communicating the flow identifier to one or more provider edge devices of a plurality of provider edge devices connected over a multicast network.

6. The method of claim 5, wherein the flow identifier of the first source is communicated to the plurality of provider edge devices within a flow identifier field using a Selective P-Multicast Service Interface (S-PMSI).

7. The method of claim 1, further comprising:
communicating the tuple indicative of the plurality of redundant sources having common flow identifiers to one or more provider edge devices of a plurality of provider edge devices connected over a multicast network.

8. The method of claim 7, wherein the tuple is communicated using a Selective P-Multicast Service Interface (S-PMSI).

9. The method of claim 1, further comprising:
receiving, at the provider edge device in communication with the first source, a request for content of the multicast flow associated with the flow identifier;
forwarding, at the provider edge device, the request for content to the first source; and
responding, at the first source, to the request for content;
wherein the first source is the Single Forwarder associated with the flow identifier.

10. The method of claim 1, further comprising:
receiving, at the provider edge device in communication with the first source, a request for content of the multicast flow associated with the flow identifier; and
dropping, at the provider edge device, the request for content;
wherein the first source is not the Single Forwarder associated with the flow identifier.

11. A system, comprising:
a provider edge device having a processor in communication with a memory, the memory including instructions executable by the processor to:
determine a flow identifier for a first source of a multicast group in communication with the provider edge device, the flow identifier indicating a multicast flow associated with the first source, and the first source being associated with a first virtual private network and one of a plurality of redundant sources that are commonly associated with the multicast flow and the flow identifier, wherein the plurality of redundant sources are each connected to a Multiprotocol Label Switching network; and
elect a redundant source of the plurality of redundant sources and associated with a second virtual private network as a Single Forwarder from a tuple indicative of the plurality of redundant sources having common flow identifiers.

12. The system of claim 11, the provider edge device being one of a plurality of provider edge devices connected over a multicast network, each respective provider edge device being in communication with a respective redundant source of the plurality of redundant sources.

13. The system of claim 12, wherein the provider edge device determines the flow identifier based on a global policy across each provider edge device of the plurality of provider edges devices such that each redundant source commonly associated with the multicast flow exhibits a same value for the flow identifier, the flow identifier being unique to the multicast flow.

14. The system of claim 11, further comprising a second processor in communication with a second memory and in communication with the provider edge device, the second memory including instructions executable by the second processor to:
group the plurality of redundant sources associated with the multicast flow, the plurality of redundant sources being a subset of a plurality of sources connected to a plurality of provider edge devices over a multicast network; and
assign the flow identifier to each redundant source of the plurality of redundant sources.

15. The system of claim 14, the second memory further including instructions executable by the second processor to:
communicate the flow identifier to one or more provider edge devices of a plurality of provider edge devices connected over a multicast network.

16. The system of claim 15, wherein the flow identifier of the first source is communicated to the plurality of provider edge devices within a flow identifier field using a Selective P-Multicast Service Interface (S-PMSI).

17. The system of claim 14, the second memory further including instructions executable by the second processor to:
communicate the tuple indicative of the plurality of redundant sources having common flow identifiers to one or more provider edge devices of a plurality of provider edge devices connected over a multicast network using a Selective P-Multicast Service Interface (S-PMSI).

18. The system of claim 11, the memory further including instructions executable by the processor to:
receive a request for content of the multicast flow associated with the flow identifier; and
forward the request for content to the first source;
wherein the first source is the Single Forwarder associated with the flow identifier.

19. The system of claim 11, the memory further including instructions executable by the processor to:
receive a request for content of the multicast flow associated with the flow identifier; and
drop the request for content;
wherein the first source is not the Single Forwarder associated with the flow identifier.

20. One or more non-transitory computer-readable media comprising computer-readable instructions, which when executed by one or more processors of a provider edge device, cause the provider edge device to:
determine a flow identifier for a first source of a multicast group, the flow identifier indicating a multicast flow associated with the first source, and the first source being associated with a first virtual private network and one of a plurality of redundant sources that are commonly associated with the multicast flow and the flow identifier, wherein the plurality of redundant sources are each connected to a Multiprotocol Label Switching network; and
elect a redundant source of the plurality of redundant sources and associated with a second virtual private network as a Single Forwarder from a tuple indicative of the plurality of redundant sources having common flow identifiers.

* * * * *